United States Patent
El Baraka et al.

(10) Patent No.: US 10,256,692 B2
(45) Date of Patent: Apr. 9, 2019

(54) INTERCONNECTION ELEMENT FOR CONNECTION OF STATOR COILS

(71) Applicant: VALEO EQUIPEMENTS ELECTRIQUES MOTEUR, Creteil (FR)

(72) Inventors: Khadija El Baraka, Bussy St Georges (FR); Svetislav Jugovic, Juvisy-sur-Orge (FR); Paul Armiroli, Marolles en Brie (FR)

(73) Assignee: Valeo Equipements Electriques Moteur, Creteil (FR)

( * ) Notice: Subject to any disclaimer, the term of this patent is extended or adjusted under 35 U.S.C. 154(b) by 234 days.

(21) Appl. No.: 15/126,544

(22) PCT Filed: Mar. 2, 2015

(86) PCT No.: PCT/FR2015/050495
§ 371 (c)(1),
(2) Date: Sep. 15, 2016

(87) PCT Pub. No.: WO2015/145007
PCT Pub. Date: Oct. 1, 2015

(65) Prior Publication Data
US 2017/0085145 A1 Mar. 23, 2017

(30) Foreign Application Priority Data
Mar. 24, 2014 (FR) ...................................... 14 52427

(51) Int. Cl.
*H02K 3/28* (2006.01)
*H02K 3/52* (2006.01)

(52) U.S. Cl.
CPC ............... *H02K 3/28* (2013.01); *H02K 3/522* (2013.01)

(58) Field of Classification Search
CPC .... H02K 3/28; H02K 3/522; H02K 3/50; H02K 3/505

(Continued)

(56) References Cited

U.S. PATENT DOCUMENTS 9,735,639 B2 * 8/2017 Shim ........................ H02K 3/28
2011/0297474 A1 * 12/2011 Aono ................... B62D 5/0403
180/443

(Continued)

FOREIGN PATENT DOCUMENTS

| FR | 2837993 | 10/2003 |
| WO | WO2013154054 | 10/2013 |
| WO | WO2014041265 | 3/2014 |

*Primary Examiner* — Forrest M Phillips
(74) *Attorney, Agent, or Firm* — Berenato & White, LLC (57) ABSTRACT

An interconnection element (24) for connecting the stator coils of a polyphase rotary electric machine (2), including a plurality of conductive layers stacked axially, including the same number of solid base layers (26, 28, 30), and additional layers (32, 34, 36), each formed by a plurality of ring portions, each one of the ring portions not covering the entire perimeter of the stator, each one of the conductive layers having internal connection tabs (40) for connecting the coils and external connection tabs (48, 50) for connecting to connected electrical devices (4, 20), the number of base layers and additional layers being equal to the number of phases of the machine to which the interconnection element is added.

20 Claims, 3 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2013/0069458 A1* | 3/2013 | Stallone | H02K 3/505 |
| | | | 310/71 |
| 2015/0015100 A1* | 1/2015 | Koch | H02K 3/522 |
| | | | 310/71 |
| 2015/0381002 A1* | 12/2015 | Hashimoto | H02K 3/522 |
| | | | 310/71 |
| 2016/0072350 A1* | 3/2016 | Kim | H02K 3/522 |
| | | | 310/43 |
| 2017/0093239 A1* | 3/2017 | Teranishi | H02K 1/146 |
| 2018/0159397 A1* | 6/2018 | Houzumi | H02K 3/38 |

* cited by examiner

Fig.7 Y - Per

Fig.8 Δ - Per

Fig.9 Y - Ser + M

Fig.10 Δ - Per

INTERCONNECTION ELEMENT FOR CONNECTION OF STATOR COILS

CROSS-REFERENCE TO RELATED APPLICATIONS AND CLAIM TO PRIORITY

This application is a national stage application of International Application No. PCT/FR2015/050495 filed Mar. 2, 2015, which claims priority to French Patent Application No. 1452427 filed Mar. 24, 2014, the disclosures of which are incorporated herein by reference and to which priority is claimed.

FIELD OF THE INVENTION

The present invention relates to an interconnection device which is arranged between coils of a stator and an electrical rectification circuit of the inverter type. More particularly, it relates to an interconnection device which is associated with a stator of a reversible rotary polyphase electrical machine, such as, for example, an alternator-starter of a motor vehicle.

Within the context of the invention, the term "polyphase" relates more particularly to three-phase rotary electrical machines, but it can also relate to rotary electrical machines with a different number of phases.

BACKGROUND OF THE INVENTION

As is well known, an alternator-starter comprises a rotor which constitutes an inductor, and a polyphase stator which supports a plurality of coils or windings which constitute an armature, and which exchange electric power with a reversible alternating/direct converter comprising series of transistors, this converter being connected to a rechargeable battery.

Depending on the mode selected by the vehicle electronics, the alternator-starter can function equally well in an alternator mode, in which, via the reversible alternating/direct converter, it makes it possible to charge the vehicle battery and/or any other energy storage unit with rectified direct voltage, or, in a reversible manner in a starter or engine mode, in particular for starting of the vehicle or to assist with starting up, i.e. for temporary additional power for the engine.

In an arrangement of this type of electrical connection of windings, it is possible to have different configurations of electrical connection. The windings can be connected in configurations which moreover are known, in the form of a star or a triangle, depending on the voltage values of the motor and of the network available.

SUMMARY OF THE INVENTION

The objective of the present invention is to simplify the connection in a context of multiple connection configurations. For this purpose, it proposes an interconnection element for connection of stator coils of a polyphase rotary electrical machine, characterised in that it comprises a plurality of axially stacked conductive layers, including the same number of solid base layers, and additional layers each formed by a plurality of parts of rings, each of the said parts of rings not covering all of the periphery of the stator. Each of these conductive layers supports inner connection lugs for connection of the coils, and outer connection lugs for connection to connected electrical equipment.

According to a characteristic of the invention, the number of base layers and additional layers is equal to the number of phases of the machine on which the interconnection element is added.

According to another characteristic of the invention, each of the additional layers is formed by two half-rings.

The conductive layers are arranged axially above one another, without electrical contact with one another. It is possible to provide an electrical insulator between each of the layers.

According to a characteristic of the invention, the inner connection lugs face towards the interior of the interconnection element, and the outer connection lugs extend the outer lateral wall of the layers which form the interconnection element. The inner connection lugs, which are more fragile, are accommodated inside the interconnection element, and are thus protected.

Advantageously, each layer supports a number of inner connection lugs which is equal to the number of coils per phase, whereas the number of outer connection lugs is independent from the number of coils, with the base layers each supporting a single outer connection lug, whereas the additional layers each support a plurality of outer connection lugs, one per part of ring.

According to different characteristics, concerning more particularly the half-rings which form the additional layers:
the outer connection lugs which are associated with the additional layers are supported by one of the ends of each of the parts of ring;
for each additional layer, all of the parts of ring of the said additional layer have an angular dimensional which is smaller than that of the base layers, such that a rupture area is formed between the ends opposite of two parts of ring of a single additional layer;
each of the parts of ring which forms part of an additional layer has a structure identical to that of the adjacent part of ring, with the parts of ring which are arranged axially above one another being offset angularly around the common axis of the machine and the interconnection element, such that the inner connection lugs do not overlap, and are distributed angularly regularly. The angular offsetting with which the parts of ring of the different additional layers are arranged relative to one another is equal to 360° divided by the total number of inner connection lugs supported by the base layers.

In order to facilitate the electrical connection of the coils on the interconnection element, the inner connection lugs of the additional layers are arranged angularly regularly, in the vicinity of the inner connection lugs of the base layers.

The inner connection lugs comprise a lateral extension which extends towards the interior of the interconnection element, on the plane of the layer which supports the connection lug, and a raised edge which extends at the free end of the lateral extension, substantially perpendicularly to the latter. The raised edges of the inner connection lugs are all oriented axially in the same direction, i.e. the direction which goes opposite the base layers. In addition, each raised edge comprises an undulating part forming a groove which faces towards the layers of the interconnection element, and can receive the connection wires of the coils.

The invention also relates to a three-phase machine with twelve coils per phase, in which an interconnection element comprises six layers, amongst which three base layers have a solid annular profile and three additional layers have a partial annular profile formed by two half-rings which are separated by two diametrically opposite rupture areas, with each base layer supporting twelve inner connection lugs for the connection of the coils, and each half-ring forming in pairs an additional layer which supports six inner connection lugs also for connection of the coils. The inner connection lugs are arranged such that an inner connection lug which is associated with an additional layer is arranged in the vicinity of an interconnection lug which is associated with a base layer, and such that the successive inner connection lugs of a single layer are distributed angularly with a regular angular pitch of 30° in the case when twelve coils per phase are used.

More generally, the regular angular pitch can depend on the number of coils per phase NumberOfCoils according to the formula: angular pitch=360/(NumberOfCoils).

Advantageously, six coils of a single phase are connected firstly to the six inner connection lugs associated with one of the half-rings of one of the additional layers, and secondly to six inner connection lugs associated with one of the base layers, whereas the six remaining coils of the same phase are connected firstly to the six inner connection lugs associated with the opposite half-ring of the said additional layer, and secondly to the remaining six inner connection lugs associated with the said base layer.

BRIEF DESCRIPTION OF THE DRAWINGS

The invention will now be described more completely with reference to FIGS. 1 to 10, in which.

DETAILED DESCRIPTION OF THE PREFERRED EMBODIMENT(S)

Figure 1:
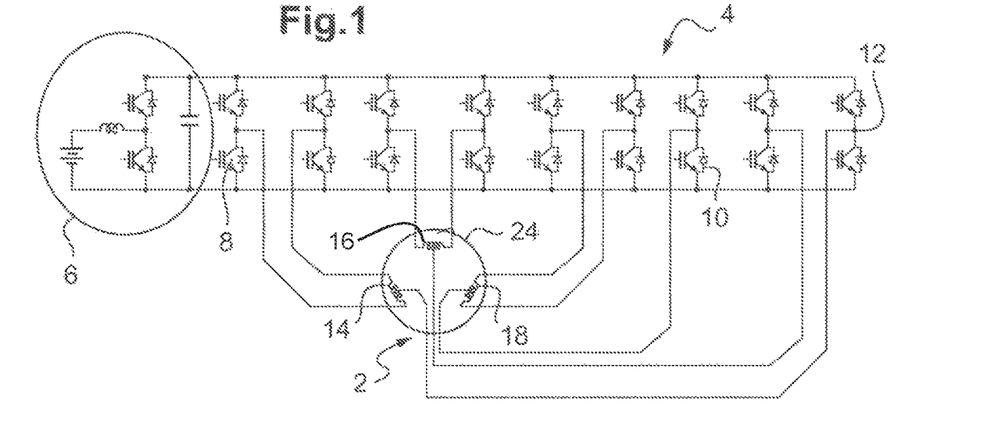
FIG. 1 is an electrical assembly diagram according to a first embodiment of the invention, of a three-phase rotary electrical machine, of an electrical converter and a battery, the said machine and the converter being connected by an interconnection element.

FIG. 1 illustrates an electrical assembly diagram according to the invention, in which a rotary machine 2 is connected to power switches of an electric current converter 4, arranged between the rotary machine and an assembly 6 formed by a battery and a boost converter.

Hereinafter, without limiting in any way the scope of the invention, and unless otherwise stated, the context of its preferred application will apply, i.e. the case of an alternating-direct electric current converter for a three-phase alternator-starter.

The converter 4 comprises power switches 8 which form a semiconductor rectifier bridge. In this case, the converter comprises nine arms 10 of two power switches in series formed by MOSFET transistors, each of the arms being arranged between the "−" and "+" poles of the battery. A structure of this type is well known to persons skilled in the art, and does not need to be described hereinafter. The midpoint of each of the arms 12 is connected to an input/output point of the stator, whereas the ends of the arms are connected to the "+" and "−" outputs of the vehicle battery, or any other electrical energy storage unit.

Here, in a more detailed manner, it can be determined that a winding 14 associated with a first phase is connected at each of its ends to the midpoint of a first arm and a second arm of the converter, and that the same applies to a winding 16 associated with the second phase, connected at each of its ends to the midpoint of a third arm and a fourth arm, as well as to a winding 18 associated with the third phase, connected at each of its ends to the midpoint of a fifth arm and a sixth arm of the converter. The last three of the nine arms are connected at their midpoint to distinct input/output points of the phase windings.

Figure 2:
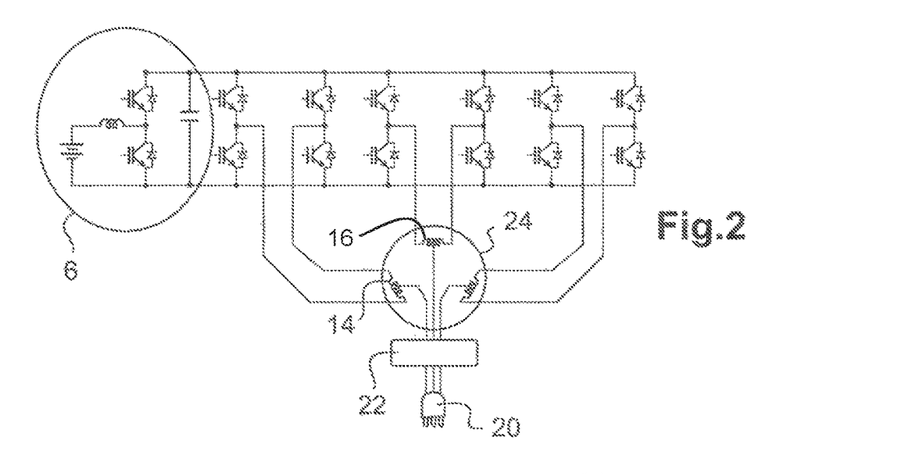
FIG. 2 is an electrical assembly diagram according to a second embodiment of the invention, in which the interconnection element connects the machine and the converter, as well as an electrical connection plug.

FIG. 2 illustrates a wiring diagram which differs in that the converter comprises only six arms, and in that an electrical connection plug 20 is arranged at the output of the rotary electrical machine, via an EMI filter 22 which is designed to eliminate electromagnetic interference. An arrangement of this type is particularly advantageous in that it makes it possible to obtain a direct connection to an external electrical network in order to recharge the batteries.

In the two cases illustrated schematically above, the electrical connection of the coil windings to the rectifiers of the converters and to the complementary electrical connection elements, such as that in FIG. 2, is easily carried out by use of an interconnection element 24.

According to the invention, this interconnection element is arranged at a front end of the stator of the rotary electrical machine, in order to form the link between the coils arranged in the interior of the stator and the electrical equipment, converter or the like, arranged on the exterior of the stator. The interconnection element according to the invention is particularly suitable for creation of wiring of this type, in order to limit the wiring distances, and to permit after all great flexibility in order to adapt to the different connection configurations possible.

Figure 3:
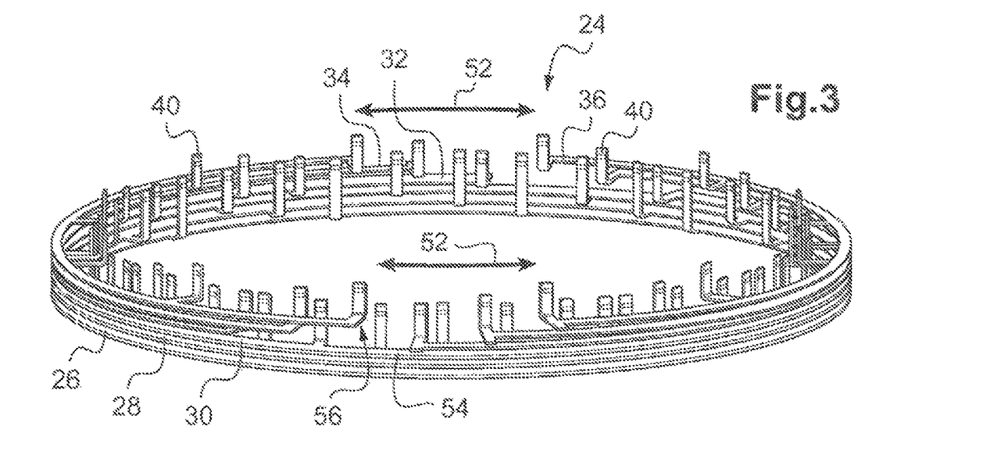
FIG. 3 is a representation in perspective of the interconnection element according to the invention, as it can be implemented for example in FIGS. 1 and 2.
Figure 4:
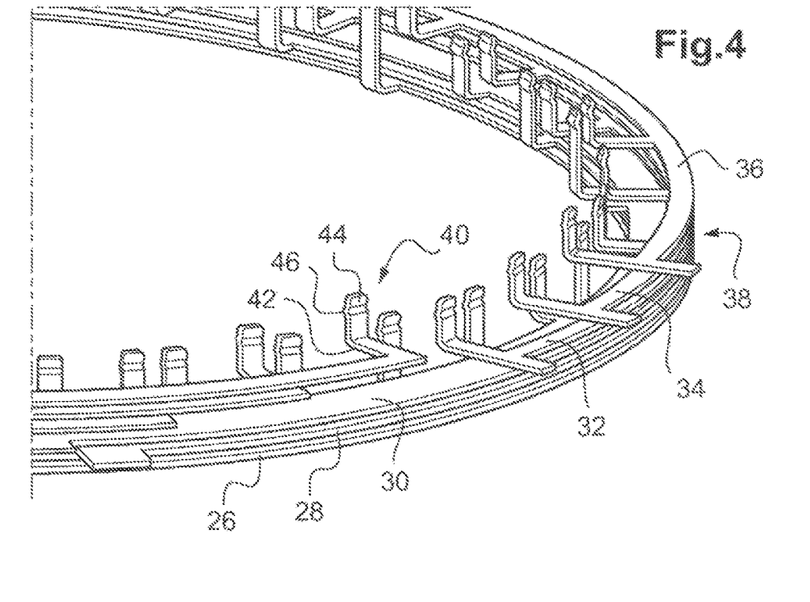
FIG. 4 is a detailed view of the interconnection element in FIG. 3.
Figure 5:
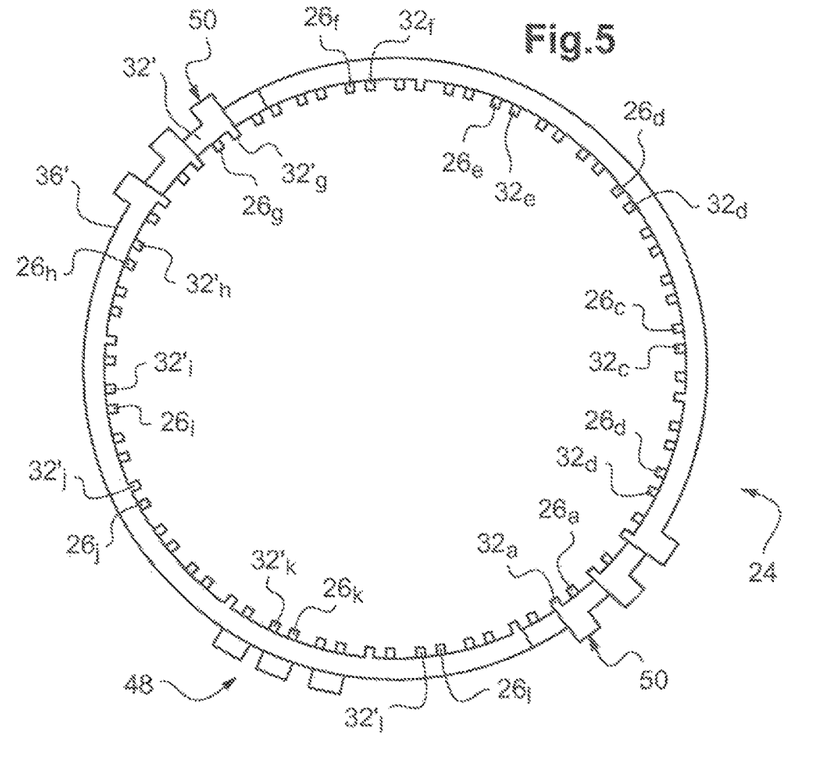
FIG. 5 is a diagram which explains some assembly combinations possible with the interconnection element.

For this purpose, as illustrated in FIGS. 3 to 5, the interconnection element 24 according to the invention comprises six annular layers which are concentric relative to one another, and are arranged in succession axially above one another. These layers are made of an electrically conductive material, such as copper for example.

The layers are arranged spaced axially from one another, by a distance which is sufficient to prevent the electromagnetic disturbances, and to ensure electrical insulation between them. It will be possible to slip a sheet of an electrical insulator between each of the conductive layers.

Three base layers and three additional layers in particular are distinguished. A first base layer 26 is designed to be supported opposite a front end of the stator, and, on the axis of the stator, a second base layer 28, a third base layer 30, a first additional layer 32 a second additional layer 34 and a third additional layer 36 succeed one another axially, with the third additional layer forming the layer furthest from the stator.

In order to secure the interconnection element 24 comprising base layers and additional layers, it is possible for example to provide overmoulding on the stator. It is also possible to provide layers which are overmoulded relative to one another, with this assembly which forms the interconnector being placed or secured on the stator.

The three base layers are formed by solid metal rings, which create continuous tracks 26, 28, 30, whereas the three additional layers are each formed by two half-rings, thus creating six half-tracks tracks 32, 32', 34, 34', 36, 36'.

In the case of a three-phase machine, i.e. comprising three phases, the first phase is associated with the first base layer 26 and with the two first additional layers 32 and 32', the second phase is associated with the second base layer 28 and with the two first additional layers 34 and 34', and the third phase is associated with the third base layer 30 and with the two first additional layers 36 and 36'.

Persons skilled in the art will easily be able to adapt these associations in the case of a hexaphase or multiphase machine, with each of the phases being associated with a base layer and an additional layer, the said additional layer comprising two half-rings.

The advantage of using half-rings to form the additional layers and solid rings to form the base layers will be explained hereinafter by describing the connection of the coils on the interconnection element. Each of these layers comprises connection lugs which extend from the radially projecting layers, firstly for the electrical connection of the interconnection device on the ends of the coil windings, and secondly for the electrical connection of the interconnection device on the electrical converter.

As can be seen more particularly in FIGS. 4 and 5, two types of connection lugs can be distinguished, according to whether they extend radially projecting, prolonging the outer lateral wall 38, or the inner lateral wall of the different layers.

Thus, the inner connection lugs 40 face radially towards the interior of the interconnection element. The number of inner connection lugs depends on the number of coils arranged in the stator. In the example illustrated, the stator comprises twelve coils per phase, such that each of the half-rings which forms an additional layer comprises six inner connection lugs, whereas each of the rings which forms a base layer comprises twelve inner connection lugs.

In this example, each layer comprises twelve inner connection lugs, distributed annularly with a regular pitch of 30° between each of the lugs. There are thus thirty six inner connection lugs associated with the base layers, and thirty six inner connection lugs associated with the additional layers. The connection lugs are arranged in the interconnection element such that, firstly, the thirty six inner connection lugs associated with the base layers are distributed regularly, and therefore spaced from one another by ten degrees (336°/36=10°), and secondly, each of the inner connection lugs supported by one of the additional layers extends in the vicinity of a connection lug which is supported by one of the base layers, such as to facilitate the connection of the ends of a single phase winding.

The inner connection lugs 40 are in the form of an "L", with, as can be seen in particular in FIG. 4, a lateral extension 42 which extends towards the interior of the interconnection element, on the plane of the layer which the connection lug extends, and a raised edge 44 which extends at the free end of the lateral extension, substantially perpendicular to this lateral extension. The raised edges of the inner connection lugs are all oriented axially in the same direction, i.e. the direction which goes opposite the base layers, in other words opposite the stator when the interconnection element is in place. Each raised edge comprises an undulating part which forms a groove 46 facing towards the layers of the interconnection element, and designed to receive the ends of the coil windings, and permit rapid securing of these windings.

In addition, outer connection lugs face radially towards the exterior of the interconnection element. Unlike the number of inner connection lugs, the number of outer connection lugs is provided independently from the number of coils arranged in the stator. A single outer connection lug is provided for each of the base layers of the interconnection element, whereas two outer connection lugs are provided for each of the additional layers of the interconnection element, i.e. one per half-ring.

The outer connection lugs associated with the base layers 48 are in the form of flat plates which extend projecting transversely from the base layers on the plane of the latter. It is ensured during the assembly of the different layers of the interconnection element that these outer connection lugs are arranged adjacent to one another.

The outer connection lugs which are associated with an additional layer 50 are formed at a first end of each of the half-rings, which also supports an inner connection lug, facing towards the interior of the interconnection element.

The six half-rings which form the three additional layers are identical. All six of them have the same angular length, their inner connection lugs are distributed angularly identically, with the same pitch, with each end supporting one of the six inner connection lugs, and the raised edge of these inner connection lugs has the same height.

As can be seen in the figures, the angular length of the half-rings is slightly less than half the periphery of the interconnection element, such that, when the two half-rings of a single layer are in place, for each of the additional layers there are two diametrically opposite rupture areas 52. In the finished interconnection element, the additional layers are arranged angularly offset relative to one another. The first end 54 of a half-ring of the first additional layer is placed in a given position, so that the inner connection lug which it supports extends in the vicinity of an inner connection lug of one of the base layers. The half-ring is then placed opposite this first additional layer, providing two diametrically opposite rupture areas with the same angular size. The first end of a half-ring of the second additional layer is then positioned with angular offsetting relative to half-ring of the first additional layer, which is equal to the angular offsetting which exists between two successive connection lugs supported equally well by one or the other of the additional layers, and in this case is 10°. The opposite half-ring is then put into place, and the operation is repeated for the positioning of the half-rings of the third additional layer.

Thus, the diametrically opposite rupture areas of each of the layers overlap. This therefore provides a regular arrangement of the connection lugs around the entire periphery of the interconnection element. An end of the third additional layer 56 is brought close, to within the angular offsetting, to the first end of the first additional layer 54 which had been put into place initially.

When the interconnection element is in place on the stator, the windings of the twelve coils per phase are connected on each of the inner connection lugs, whereas the outer connection lugs are used to connect the interconnection element on the electrical converter, and optionally, in the case illustrated in FIG. 2, to an additional electric component such as a plug-in.

The presence of half-rings in the additional layers makes it possible to wire the twelve coils of a phase equally well in series or in parallel in groups of six coils. The electrical converter to which each of the phases windings is connected makes it possible to switch the power switch arms in order to control how the phases are connected.

For the sake of clarity of FIG. 5, distinct references are given only to the inner connection lugs 32a, 32b, 32c, 32d, 32e, 32f, 32'g, 32'h, 32'i, 32'j, 32'k and 32'l of the two half tracks 32 and 32' corresponding to the first additional layer, the outer connection lugs 48 and 50, and the inner connection lugs of the first base layer 26a, 26b, 26c, 26d, 26e, 26f, 26g, 26h, 26i, 26j, 26k and 26l, adding a index in order to identify each of the distinct connection lugs on a single track. This means that only the tracks and connection lugs of a first phase have references.

The layers of the interconnection element are arranged angularly such that the first base layer corresponds directly with the first additional layer, the second base layer corresponds directly with the second additional layer, and the third base layer corresponds directly with the third additional layer. Direct correspondence means the fact that the inner connection lugs of a base layer and of an additional layer are arranged side-by-side.

In the example illustrated, it is thus possible to connect the first base layer and the first additional layer easily, since the inner connection lugs are in the vicinity of one another around the entire periphery of the interconnection element. A first group of six coils is connected at a first end to the first additional layer by the inner connection lugs 32a to 32f which are supported by a half-ring 32, and at the other end to the first base layer by the inner connection lugs 26a to 26f. A second group of six coils is connected at a first end to the first additional layer by the inner connection lugs 32'g to 32'l which are supported by the opposite half-ring 32', and at the other end to the first base layer by the inner connection lugs 26g to 26l.

The inner connection lugs 26a to 26l of the first layer are supported by a single continuous ring 26, whereas the inner connection lugs 32a, 32b, 32c, 32d, 32e, 32f, 32'g, 32'h, 32'i, 32'j, 32'k and 32'l are supported by the half-ring 32 and by the opposite half-ring 32'.

The phase corresponding to the first layer and to the first additional layer comprises twelve coils: a, b, c, d, e, f, g, h, i, j, k and l. Each of the coils comprises two ends which are known hereinafter as the input and output.

The input of the coil a is connected to the inner connection lug 26a and the output of the coil a is connected to the inner connection lug 32a. Similarly, the input of the coil b is connected to the inner connection lug 26b, and the output of the coil b is connected to the inner connection lugs 32b, and so on, until the coil f which is connected to the inner connection lug 26f, and the output of the coil b is connected to the inner connection lug 32f.

Thus, the coils a-f are connected parallel relative to one another between the continuous ring 26 and the half-ring 32.

The input of the coil g is connected to the inner connection lug 26g, and the output of the coil g is connected to the inner connection lug 32'g. Similarly, the input of the coil h is connected to the inner connection lug 26h, and the output of the coil b is connected to the inner connection lug 32'h and so on, until the coil l which is connected to the inner connection lug 26l and the output of the coil b is connected to the inner connection lug 32'l.

Thus, the coils g-l are connected in parallel to one another between the continuous ring 26 and the opposite half-ring 32'.

The connections which have been described for the first phase are also valid for the second and third phase.

Thus, for the second phase, there are firstly obtained six coils which are parallel to one another between the continuous ring 28 and the half-ring 34, and secondly six coils which are parallel to one another between the continuous ring 28 and the opposite half-ring 34', with the continuous ring 28 and the two half-rings 34 and 34' corresponding to the second phase.

For the third phase, there are firstly obtained six coils parallel to one another between the continuous ring 30 and the half-ring 36, and secondly six coils parallel to one another between the continuous ring 30 and the opposite half-ring 36', with the continuous ring 30 and the two half-rings 36 and 36' corresponding to the third phase.

Figure 6:
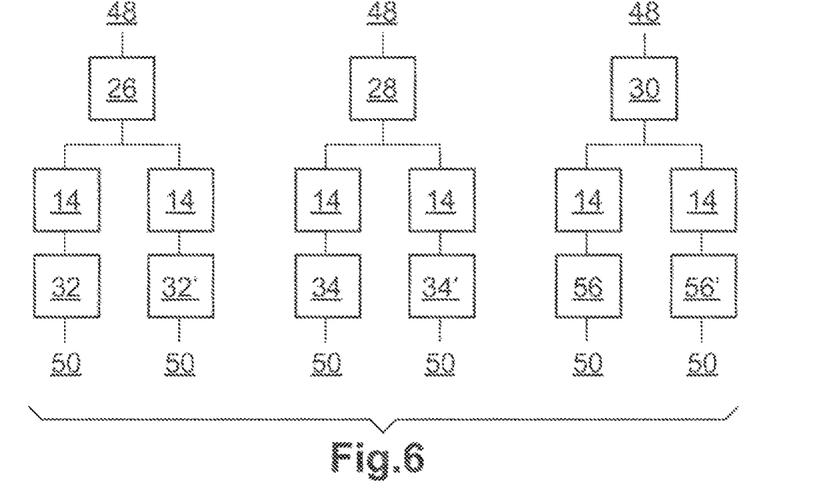
FIG. 6 is a view from above of the electrical interconnection element necessary for assembly in a star form identified in FIG. 5.

FIG. 6 illustrates schematically a circuit 60 for connection between the base layer and the additional layer. This connection circuit 60 comprises three phases.

For each of these three phases, the connection circuit 60 comprises a base layer and its outer connection lug 48, an additional layer and its two outer connection lugs 50, and two groups of coils 14. Each of the groups 14 represents six coils in parallel.

More specifically, the first phase of the connection circuit 60 is associated with the base layer 26 and with the additional layer 32, and is illustrated on the left in FIG. 6. In the first phase of the connection circuit 60, the outer connection lug 48 of the base layer 26 is connected via the two groups of coils 14 to the two connection lugs 50 which belong respectively to the two half-rings 32 and 32' of the first additional layer.

More specifically, the second phase of the connection circuit 60 is associated with the base layer 28 and with the additional layer 34, and is illustrated in the middle in FIG. 6. In the second phase of the connection circuit 60, the outer connection lug 48 of the base plate 28 is connected via the two groups of coils 14 to the two connection lugs 50 which belong respectively to the two half-rings 34 and 34' of the second additional layer.

More specifically, the third phase of the connection circuit 60 is associated with the base layer 30 and with the additional layer 36, and is illustrated on the right in FIG. 6. In the first phase of the connection circuit 60, the outer connection lug 48 of the base layer 26 is connected via the two groups of coils 14 to the two connection lugs 50 which belong respectively to the two half-rings 36 and 36' of the third additional layer. The electrical converter is connected to all the outer lugs 48 and 50 of the connection circuit 60. It is thus possible to control the connections between the outer lugs, so that it is possible to control how the three phases are connected to one another.

In particular, it is possible to switch the connection circuit 60 according to the four different configurations illustrated in FIGS. 7 to 10.

Figure 7:
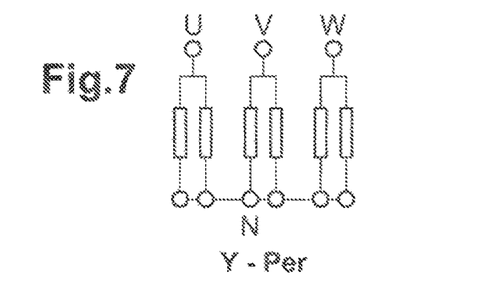
FIG. 7 illustrates schematically a first configuration of a circuit for connection.

FIG. 7 illustrates a first configuration of the connection circuit 60, according to which the six outer connection lugs 50 are all connected in series and represent the neutral, whereas the three outer connection lugs 48 represent respectively the input points of the first, second and third phases. This therefore provides a configuration which permits putting into parallel of the coils of each phase and coupling in the form of a Y or a star of the different phases.

Figure 8:
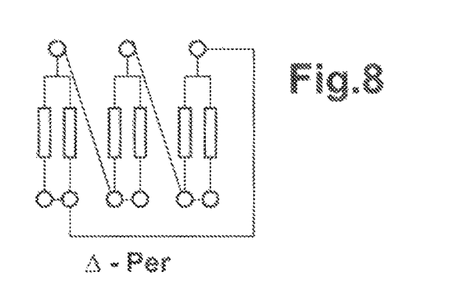
FIG. 8 illustrates schematically a second configuration of a circuit for connection.

FIG. 8 illustrates a second configuration of the connection circuit 60, according to which the two outer connection lugs 50 of each phase are connected together to an outer connection lug 48 of another phase. More specifically, the two outer connection lugs 50 of the first phase are connected together to the outer connection lug 48 of the third or final phase, the two outer connection lugs 50 of the second phase are connected together to the outer connection lug 48 of the preceding or first phase, and the two outer connection lugs 50 of the third phase are connected together to the outer connection lug 48 of the preceding phase or second phase. This therefore provides a configuration which permits putting into parallel of the coils of each phase, and coupling in the form of a delta or triangle of the different phases, with the three outer connection lugs 48 representing respectively the input points of the first, second and third phases.

Figure 9:
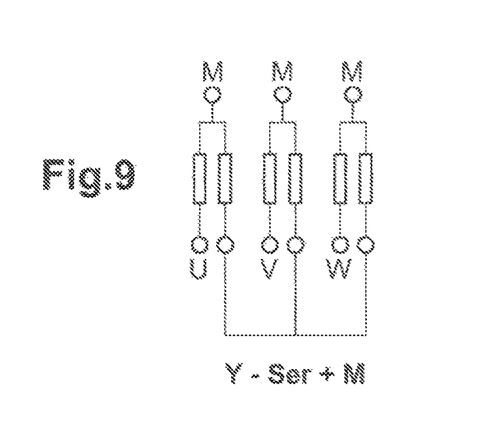
FIG. 9 illustrates schematically a third configuration of a circuit for connection.

FIG. 9 illustrates a third configuration of the connection circuit 60, according to which each of the two outer connection lugs 50 of the three phases are connected together, with the three other outer connection lugs 50 representing respectively the input points of the first, second and third phases. In addition, the three outer connection lugs 48 of the three phases each represent a midpoint. This therefore provides a configuration which permits putting into series of the groups of six coils of each phase, and coupling in the form of a star or a Y of the different phases with a midpoint.

Figure 10:
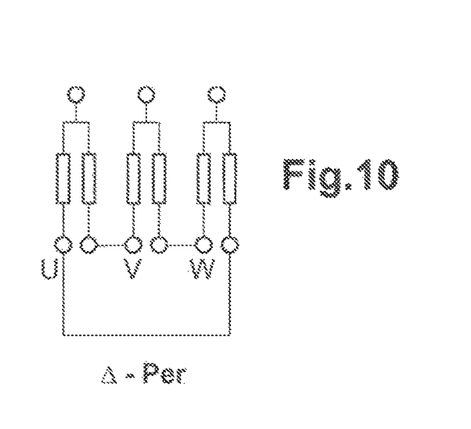
FIG. 10 illustrates schematically a fourth configuration of a circuit for connection.

FIG. 10 illustrates a fourth configuration of the connection circuit 60, according to which each of the two outer connection lugs 50 of the three phases are connected to two outer connection lugs 50 of two other phases. More specifically, one of the connection lugs 50 of the first phase is connected to the outer connection lug 50 of the third or final phase, the other connection lug 50 of the first phase is connected to the outer connection lug 50 of the following or second phase, and the other connection lug 50 of the second phase is connected to the outer connection lug 50 of the following or third phase. This therefore provides a configuration which permits putting into series of the groups of six coils of each phase, and coupling in the form of a triangle or a delta of the different phases.

According to the invention, it is possible to switch between the different configurations 1 to 4 illustrated in FIGS. 7 to 10 without needing to connect or disconnect any wire, but simply by means of controlling the electrical converter. It is thus possible to provide for development of these configurations according to the speed of rotation of the machine. For example it is possible to begin with a configuration 3, then, with the increase of the speed, for there to be transition to the configuration 4 at approximately 800 rpm, then to the configuration 1 at approximately 2000 rpm, and finally transition from the configuration 1 to the configuration 2 at approximately 4000 rpm. This therefore provides the most appropriate configuration according to the speed of rotation of the electrical machine, such as to optimise the performance.

By way of example, in order to obtain the assembly illustrated in FIG. 2, the configuration 3 is used, and the outer connection lugs associated with the half-rings of the additional layers are connected to the midpoint of the arms of power switches, and the outer connection lugs of the base layers are connected to a connecting socket via an EMI device.

In this description, the case of additional layers comprising half-rings has been described in particular. It will be appreciated that it is also possible to use for example quarters, thirds, or sixths of rings which cover respectively a quarter, a third, or a six of the periphery of the stator in order to obtain the same advantages. For example, in the case of a quarter of a ring, each phase comprises an additional layer which comprises four rings. Each of the four rings is connected to a quarter of the coils of the phase of the layer. Thus, in the case when each phase comprises twelve coils, each of the four rings is connected to three coils. Thus, in this case, each of the four rings comprises an outer connection lug 50 and three inner connection lugs.

Similarly, in this description, the case is described in particular where the additional layers each comprise an identical number of rings. It is also possible for the additional layers each dedicated to a phase each to comprise a different number of rings.

In this description, the case of a three-phase machine in particular has been described. It will be appreciated that it is also possible to use the interconnector according to the invention for a multiphase machine, for example hexaphase. In all cases, it is sufficient for the interconnector to comprise at least one additional layer and one base layer dedicated to a phase of the machine, the said additional layer comprising at least two half-rings.

The foregoing description explains clearly how the invention makes it possible to achieve the objectives which it has set out. In particular, the presence of an interconnection element such as described makes it possible to produce easily the connection of the coils, and in combination with the control of the electrical converter, to select easily whether the coils are to be connected in series or in parallel. Advantageously, the assembly formed by the interconnection element and the stator is particularly compact. The interconnection with the coils takes place radially inside the cylinder defined by the stator, but axially on the exterior. It is thus possible to connect the ends of the coils easily on the interconnection element, and the inner connection lugs remain protected.

An interconnection device as has just been described has a particular application in a polyphase rotary electrical machine which forms an alternator for a motor vehicle. Without departing from the context of the invention, the machine can be reversible, and form an alternator-starter which can function in electric motor mode in order to start the combustion engine of the vehicle, and in alternator mode in order to produce electrical energy.

The invention claimed is:

1. An interconnection element for connection of stator coils of a stator of a polyphase rotary electrical machine, the interconnection element comprising a plurality of axially stacked conductive layers including:
   solid base layers, each formed by a solid ring; and
   additional layers, each formed by at least two partial rings, each of the partial rings not covering all of a periphery of the stator;
   a number of the solid base layers being equal to a number of the additional layers;
   each of the conductive layers comprising inner connection lugs for connection of the stator coils, and outer connection lugs for connection to a connected electrical equipment;
   the number of the base layers and the number of the additional layers being equal to a number of phases of the polyphase rotary electrical machine comprising the interconnection element.

2. The interconnection element according to claim 1, wherein the additional layers are formed by two half-rings.

3. The interconnection element according to claim 1, wherein the conductive layers are arranged axially above one a not her, without electrical contact with one another.

4. The interconnection element according to claim 1, wherein the inner connection lugs face towards an interior of the interconnection element, and wherein the outer connection lugs extend from an outer lateral wall of the conductive layers which form the interconnection element.

5. The interconnection element according to claim 1, wherein each conductive layer includes a number of the inner connection lugs which is equal to a number of stator coils per phase, wherein a number of outer connection lugs is independent from a number of stator coils, wherein each of the base layers includes a single outer connection lug, and wherein the additional layers include a plurality of the outer connection lugs, one per each of the partial rings.

6. The interconnection element according to claim 1, wherein the outer connection lugs associated with the additional layers are supported by one of ends of each of the partial rings.

7. The interconnection element according to claim 1, wherein all of the partial rings of each of the additional layers have an angular dimension which is smaller than an angular dimension of each of the base layers, such that a rupture area is formed between opposite ends of two partial rings of each of the additional layers.

8. The interconnection element according to claim 1, wherein each of the partial rings which forms part of one of the additional layers has a structure identical to a structure of the adjacent one of the partial rings, wherein the partial rings which are arranged axially above one another are offset angularly around a common axis of the rotary electrical machine and the interconnection element, such that the inner connection lugs do not overlap, and are distributed angularly regularly.

9. The interconnection element according to claim 8, wherein the angular offsetting with which the partial rings of the different additional layers are arranged relative to one another is equal to 360° divided by a total number of inner connection lugs supported by the base layers.

10. The interconnection element according to claim 1, wherein the inner connection lugs of the additional layers are arranged angularly regularly, in the vicinity of the inner connection lugs of the base layers.

11. The interconnection element according to claim 1, wherein each of the inner connection lugs comprises a lateral extension which extends radially towards an interior of the interconnection element on a plane of the conductive layer which supports the inner connection lug, and a raised edge which extends at a free end of the lateral extension substantially perpendicularly thereto, and wherein the raised edges of the inner connection lugs are all oriented axially in the direction extending opposite the base layers.

12. The interconnection element according to claim 11, wherein each raised edge comprises an undulating part forming a groove which faces towards the conductive layers of the interconnection element, and is configured to receive connection wires of the stator coils.

13. A three-phase rotary electrical machine with twelve stator coils per phase, wherein the interconnection element according to claim 1 comprises six conductive layers including three base layers each having a solid annular profile and three additional layers each having a partial annular profile formed by two half-rings separated by two diametrically opposite rupture areas, each of the base layers comprising twelve inner connection lugs for the connection of the stator coils, and each of the half-rings forming in pairs one of the additional layers comprising six inner connection lugs also for connection of the stator coils, the inner connection lugs being arranged such that one of the inner connection lugs associated with one of the additional layers is arranged in the vicinity of one of the inner connection lugs associated with one of the base layers, and such that the successive connection lugs of each of the conductive layers are distributed angularly with a regular angular pitch of 30°.

14. The three-phase rotary electrical machine according to claim 13, wherein six stator coils of a single phase are connected to the six inner connection lugs associated with one of the half-rings of one of the additional layers, and to six inner connection lugs associated with one of the base layers, whereas the six remaining stator coils of the same phase are connected to the six inner connection lugs associated with the opposite half-ring of the additional layer, and to the remaining six inner connection lugs associated with the base layer.

15. The interconnection element according to claim 2, wherein the conductive layers are arranged axially above one another, without electrical contact with one another.

16. The interconnection element according to claim 2, wherein the inner connection lugs face towards an interior of the interconnection element, and wherein the outer connection lugs extend from an outer lateral wall of the conductive layers which form the interconnection element.

17. The interconnection element according to claim 3, wherein the inner connection lugs face towards an interior of the interconnection element, and wherein the outer connection lugs extend from an outer lateral wall of the conductive layers which form the interconnection element.

18. The interconnection element according to claim 2, wherein each conductive layer includes a number of the inner connection lugs which is equal to the number of the stator coils per phase, wherein the number of the outer connection lugs is independent from the number of the stator coils, wherein the base layers each includes a single outer connection lug, and wherein the additional layers include a plurality of the outer connection lugs, one per each of the partial rings.

19. The interconnection element according to claim 3, wherein each conductive layer includes a number of the inner connection lugs which is equal to the number of the stator coils per phase, wherein the number of the outer connection lugs is independent from the number of the stator coils, wherein the base layers each includes a single outer connection lug, and wherein the additional layers include a plurality of the outer connection lugs, one per each of the partial rings.

20. The interconnection element according to claim 4, wherein each conductive layer includes a number of the inner connection lugs which is equal to the number of the stator coils per phase, wherein the number of the outer connection lugs is independent from the number of the stator coils, wherein the base layers each includes a single outer connection lug, and wherein the additional layers include a plurality of the outer connection lugs, one per each of the partial rings.

* * * * *